United States Patent [19]
Yeo

[11] 3,863,316
[45] Feb. 4, 1975

[54] ROTARY CUTTING TOOL AND METHOD OF MANUFACTURING SAME

[76] Inventor: Herbert G. Yeo, Limerock Ave., Lincoln, R.I. 02865

[22] Filed: Dec. 7, 1973

[21] Appl. No.: 422,975

[52] U.S. Cl............... 29/103 A, 76/101 A, 408/230
[51] Int. Cl............................................. B26d 1/12
[58] Field of Search..... 29/103 A, 105 R; 76/108 R, 76/101 A; 408/230

[56] References Cited
UNITED STATES PATENTS
2,377,329  6/1945  Dettmer........................... 29/103 A
3,058,199  10/1962  Cave et al......................... 29/103 A
FOREIGN PATENTS OR APPLICATIONS
736,449  6/1943  Germany.......................... 29/103 A

*Primary Examiner*—Leonidas Vlachos
*Attorney, Agent, or Firm*—Weingarten, Maxham & Schurgin

[57] ABSTRACT

An improved rotary cutting tool suitable for cutting and finishing workpiece surfaces. This tool prevents the formation of ragged edges on workpieces which normally result from edge cutting operations. The tool prevents the formation of burrs normally made by routers by including a second cutting edge for cutting at an angle substantially perpendicular to the first cutting edge. A cut is made inwardly from each surface of the workpiece, that is, one set of cutting edges cuts toward the tool tip and another set of cutting edges cuts toward the shank, with the crossover point between the two cutting edges being located between the workpiece surfaces.

6 Claims, 2 Drawing Figures

PATENTED FEB 4 1975  3,863,316

ROTARY CUTTING TOOL AND METHOD OF MANUFACTURING SAME

FIELD OF THE INVENTION

This invention relates to rotary cutting and shaping tools and more particularly to such tools capable of routing and milling without forming ragged edges on the workpiece.

DISCUSSION OF THE PRIOR ART

Fabrication operations performed upon rigid materials such as metals or glass epoxy circuit boards with a conductive metal laminate on one or both sides, require numerous operations involving cutting and shaping that normally result in a ragged edge of metal particles on the workpiece. After cutting, routing, milling or other fabrication operation, the removal of the ragged edge of metal particles, generally known as burrs, usually must be removed before the product may be further shaped or incorporated into a finished product. In many cases the failure to remove burrs may leave the workpiece unusable due to surface imperfections and the razor sharp condition of the surface which could result in cuts and scratches to the unwary. As a result, deburring operations are generally required after each step in metal or circuit board fabrication.

Deburring operations have often been accomplished by grinding, sanding or filing the surfaces of the workpiece by hand which has resulted in a variety of technical and economic problems. One of the problems associated with current deburring operations reside in the extra costs involved in requiring workers to spend considerable time on the edges of workpieces. Such auxiliary operations have often resulted in other economic losses resulting from the destruction of close tolerances which may be required for some purposes. In many deburring operations the technical and economical considerations are relatively minor compared with the health problems caused by the inhalation by employees of metallic or glass particles which in some cases may be of a carcinogenic nature.

A patent issued to A. B. Dettmer in 1945 (U.S. Pat. No. 2,377,329) shows an end mill designed to accomplish similar results. However, that device had a complex structure and was difficult to produce. The milling tool disclosed by Dettmer has a cutting edge with a right hand helix, right hand cut which stops at the first intersection of the cutting edge of the left hand helix, right hand cut adjacent the tip of the tool. Further, the tip of the tool has an axial clearance area to which the left hand helix cutting edge extends, while the right hand helix cutting edge extends from the tip only rearwardly to the first left hand helix where it terminates. As a result, the milling tool disclosed by Dettmer would be quite expensive and difficult to form, and consequently not commercially feasible.

SUMMARY OF THE INVENTION

In accordance with the present invention, the necessity for deburring is eliminated by the use of a rotary cutting tool capable of simultaneously cutting and effectively preventing the formation of burrs at the surfaces of the workpiece. Rotary cutting tools such as mills, drills and routers of the present invention prevent the formation of ragged edges on the surfaces of fabricated workpieces by employing a second cutting edge having an angle of cut substantially perpendicular to the first cutting edge. In operation, one cutting edge adjacent the tool tip pulls metal up from the backside of the workpiece and a second cutting edge cuts and pushes metal inwardly from the front surface of the workpiece closer to the tool shank. A crossover point whereby the two perpendicular cutting edges longitudinally overlap is positioned between the surfaces of the workpiece so that neither cutting edge rips outwardly in such a way that a ragged edge would be formed.

The rotary cutting tool of the present invention is formed with the cutting edge of the right helix passing through at least the first intersection of the left helix and terminating in the flute of the left helix at the second or later intersection. This feature provides for relative ease and economy in the manufacture of the tool and in operation provides efficient chip and particle removal from the workpiece thereby eliminating clogging and the generation of excessive heat which might impart undesirable properties in some materials. The method by which the tool is formed is also disclosed herein.

BRIEF DESCRIPTION OF THE DRAWING

The objects, advantages and features of this invention will be more fully understood from the following detailed description taken in conjunction with the accompanying drawing in which.

DETAILED DESCRIPTION OF THE INVENTION

Figure 1:
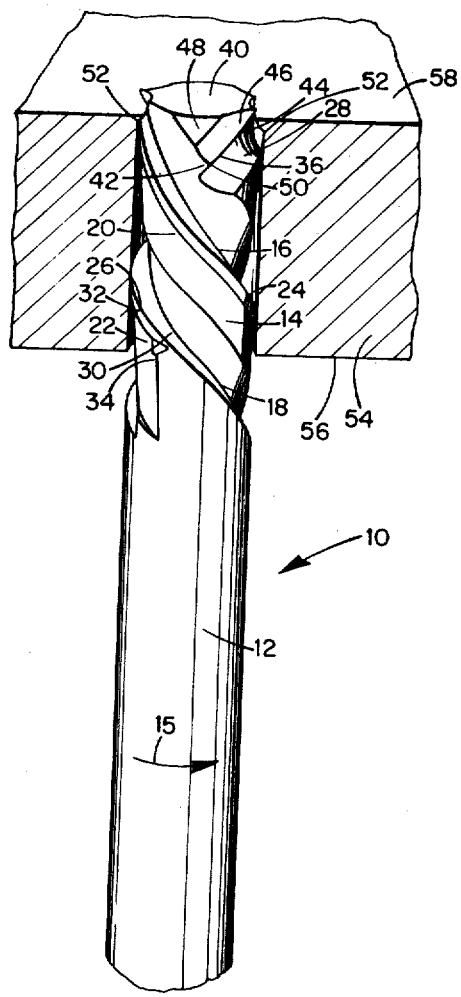
FIG. 1 is a perspective view of an end mill formed according to the present invention.

With reference to FIG. 1, there is shown as end mill 10 which includes a shank 12 suitable for engagement by a rotary cutting machine chuck (not shown), and a helical fluted portion 14. End mill 10 is disposed to rotate in a direction indicated by directional arrow 15. The helical portion has two parallel helical spiralling left hand flutes 16, 18 and two parallel helical left hand lands 20, 22 having two right hand cutting edges 24, 26 disposed thereon. Flute 18, land 22 and cutting edge 26 begin at shank portion 12 and spiral toward the front end 40 of mill 10 and terminate in a right hand flute 28 disposed at an angle substantially perpendicular to the angle of flute 18. Cutting edge 26 is formed in the usual manner, being a sharp edge and having forward and rearward backoff clearances 30 and 32 respectfully, and secondary clearance 34. Cutting edge 24 is formed similarly. Right hand helix, right hand cutting edge 36 extends rearwardly from end 40 of the tool at an angle substantially perpendicular to cutting edge 26 and parallel to flute 28. A second right hand helical cutting edge is formed on the side of the tool opposite edge 26. These cutting edges are also formed in a manner similar to the left helical cutting edges previously discussed including land 42, forward and rearward backoff clearances 44 and 46 and secondary clearance 48. The left and right hand cutting edges are disposed at angles of approximately 45° from the axis of the tool and extend radially equal distances from the tool axis.

In constructing the tool of FIG. 1, dual left hand helical lands 20, 22 are formed to extend the full distance from shank 12 to end 40. Right helical flutes 28 are then formed extending rearwardly a distance to intersect and pass through at least one of the left hand helical lands to form cutting edges 36. Flutes 28 and 16 are preferably of substantially equal depth and flute 28 opens into flute 16. By forming the tool in this manner, rearward termination 50 of cutting edge 36 is located at a point closer to the shank than is forward termination 52 of cutting edge 24, thus creating a short distance where cutting is accomplished by both the left and right hand cutting edges. This short redundancy is termed a crossover or overlapping point and is essential to the operation of the tool. The angles of the helices may be other than 45°, the primary criterion being the formation of an overlap of cutting edges as previously mentioned.

By positioning the tool with respect to workpiece 54, a sheet of metal as shown in FIG. 1, that is, with the crossover point between front and back surfaces 56 and 58 respectively of the workpiece, no burrs can be formed. Cutting edges 24, 26 cut inwardly or forwardly at surface 56 and cutting edges 36 cut inwardly or rearwardly at surface 58, thus forming a smooth, completely finished edge on workpiece 54. It may be noted that the tool can handle a workpiece having a thickness as great as the length of the fluted portion, the only criterion being that the crossover point be located between the outside surfaces of the workpiece.

Using the same principles, it is possible to locate the crossover point at any place along the length of the fluted portion. The right hand helix could extend farther toward the shank and the left hand helix could extend from the shank a substantially shorter distance toward the end of the tool. In manufacturing the tool, either the right or left helix may be formed first and the other cut into the tool a longitudinal distance sufficient to cut across at least the first intersection with the first formed helical land. Also neither helix need extend the full length of the tool; one may extend part way from the shank toward the tip and the other from the tip toward the shank a distance sufficient to create the desired intersection and crossover point.

Figure 2:
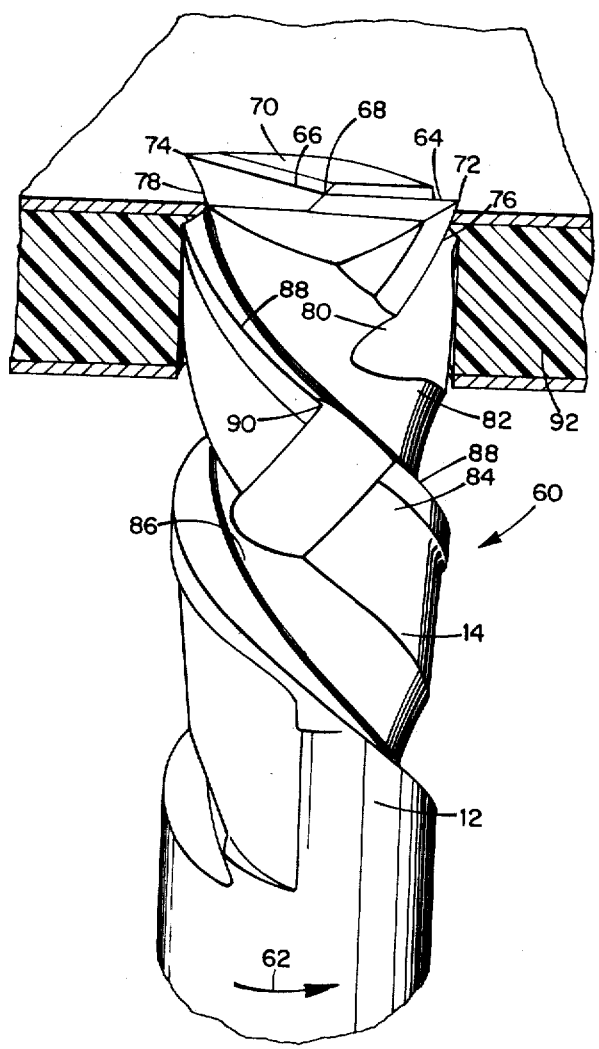
FIG. 2 is a perspective view of a router drill constructed according to the present invention.

The present invention may be advantageously employed in other types of rotary cutting tools such as the drill router 60 shown in FIG. 2. This combined drill and router rotates in the direction as depicted by arrow 62 and has a shank portion 12 and a fluted portion 14 as in FIG. 1. There are two differences depicted in FIG. 2 which are important to discuss. Forward facing radial cutting edges 64 and 66 are provided to permit the tool to act as a drill. Forward end 70 of the tool is concave, with center point 68 being the apex of the depression. Radial points 72 and 74 are the intersection of cutting edges 64, 66 with right hand helical cutting edges 76 and 78 respectively and are located farther forward than central point 68.

The tool of FIG. 2 is also shown with flute 80 intersecting and passing through both left hand helical lands 82 and 84 and terminating in flute 86. This shortens the working length of the tool, but is easier to form because, since cutting edge 88 is intersected when forming cutting edge 76, no special precision is necessary in stopping the tool by which flute 80 is cut. This alternative embodiment has no connection with the drilling tip shown in this figure, but is merely shown here for convenience. It is less expensive to extend flute 80 in forming the mill than to stop the flute 28 as shown in FIG. 1, but the tool thus formed has more limited value in that the useful length is shorter. Thus rearward termination 90 of cutting edge 88 marks the extent of useful length of the tool from the tip to that point. A typical example of a sheet of material 92 is shown which may be operated upon by the tool of FIG. 2. This material is a glass epoxy circuit board having conductive metal layers on each side.

In using the tool of FIG. 2 as a drill router, it may be moved axially to drill a hole part way through a workpiece to a depth whereby the crossover point is below the front or top surface. Then the tool may be used as a mill and moved laterally (or radially) to form a clean, flat bottomed groove in the workpiece. It is apparent that a single tool constructed in accordance with this invention may be used for more than one purpose as has been described.

While the description of this rotary milling tool has been directed to applications involving the cutting of metal workpieces, it will be appreciated that the present invention may be used upon other materials such as wood, plastic or others which have a tendency to splinter or form ridges of particles upon the workpiece surfaces as a result of such cutting operations. Also, while dual helices are preferred, single or multiple helix configurations may be employed. The depths of the right and left flutes may be identical but they need not be so. The tool may be made of such material as standard high speed steel, cobalt steel or carbide.

It will be appreciated that the invention can be implemented in different ways by those skilled in the art to suit particular requirements which are within the scope of the invention.

I claim:
1. An improved rotary cutting tool comprising:
a shank portion; and
a fluted portion;
said fluted portion having a first double helical cutting edge means beginning at said shank portion and extending forward around said fluted portion in one direction to a point adjacent to but short of the end of said fluted portion and comprising first double helical parallel cutting edges on lands spaced by first double helical parallel flutes;
said fluted portion having a second double helical cutting edge means extending around said fluted portion in the other direction from the end of said fluted portion toward said shank portion to a point closer to said shank than is the forward termination of said first double helical cutting edge means and comprising second double helical parallel cutting edges on lands spaced by second double helical parallel flutes;
whereby the rearward end of said second double helical cutting edge means longitudinally overlaps the forward end of said first double helical cutting edge means; the flute of each of said second double helical cutting edge means extending through one cutting edge land and at least into the next cutting edge land of said first double helical cutting edge means.

2. The tool of claim 1 wherein the forward end of said fluted portion is formed with end facing radially disposed third cutting edges, the end of said tool being convex and having a depressed apex on the axis of said tool.

3. The tool of claim 2 wherein said second double helical cutting edges terminate at the forward end of said tool at a point common with the radial outer termination point of said respective third cutting edges.

4. The tool of claim 1 wherein said first double helical cutting edges are arranged at a 45° left hand angle with respect to the axis of said tool and wherein said second double helical cutting edges are arranged at a 45° right hand angle with respect to said axis.

5. A method of manufacturing a rotary cutting tool comprising the steps of:

forming first double helical parallel flutes and lands extending from the shank of said tool toward the tip helically in one direction;

forming second double helical parallel flutes and lands extending from the tip of said tool rearwardly in the opposite helical direction, said second double helical flutes passing through at least the first intersection with said first double helical lands; and forming a cutting edge on the right hand edges of both said first and second double helical lands.

6. the method recited in claim 5 wherein said second double helical flutes extend through the second intersection with said first double helical lands.

* * * * *